United States Patent [19]

Sanders

[11] Patent Number: 4,685,046
[45] Date of Patent: Aug. 4, 1987

[54] LOW VOLTAGE DIRECT CURRENT POWER SUPPLY

[75] Inventor: Gary G. Sanders, Lakewood, Ohio

[73] Assignee: The Scott & Fetzer Company, Cleveland, Ohio

[21] Appl. No.: 783,878

[22] Filed: Oct. 3, 1985

[51] Int. Cl.⁴ .......................... H02M 7/04; G05F 5/00
[52] U.S. Cl. ...................................... 363/89; 323/299; 363/124
[58] Field of Search .......................... 363/89, 124, 126; 323/299, 300

[56] References Cited

U.S. PATENT DOCUMENTS

| | | | |
|---|---|---|---|
| 3,068,392 | 12/1962 | Santelmann, Jr. | 363/89 |
| 3,139,575 | 6/1964 | Brown | 363/89 |
| 3,156,860 | 11/1964 | Paynter | 363/89 |
| 4,001,668 | 1/1977 | Lewis | 363/89 |
| 4,347,561 | 8/1982 | McLellan | 363/45 |

Primary Examiner—Patrick R. Salce
Assistant Examiner—Jeffrey Sterrett
Attorney, Agent, or Firm—Pearne, Gordon, McCoy & Granger

[57] ABSTRACT

A full-wave bridge rectifier has its input connected directly across a 115 volt RMS alternating current line operating at 60 Hz wherein the output of the bridge provides 120 Hz pulsating direct current at 161 peak volts. A pair of transistors, switching on and off in alternating fashion, continuously apply to a low power requirement load only a leading edge portion and a trailing edge portion of each of the 120 Hz direct current pulses. The resultant direct current voltage, e.g. 11.3 peak volts, across the load is thus substantially reduced to a desirable level as compared to the voltage, 161 peak volts, of the pulsating direct current provided at the line driven bridge output. In another embodiment, the function of the transistors is provided by a pair of operational amplifiers which control the switching of a field-effect transistor in series with the load.

8 Claims, 10 Drawing Figures

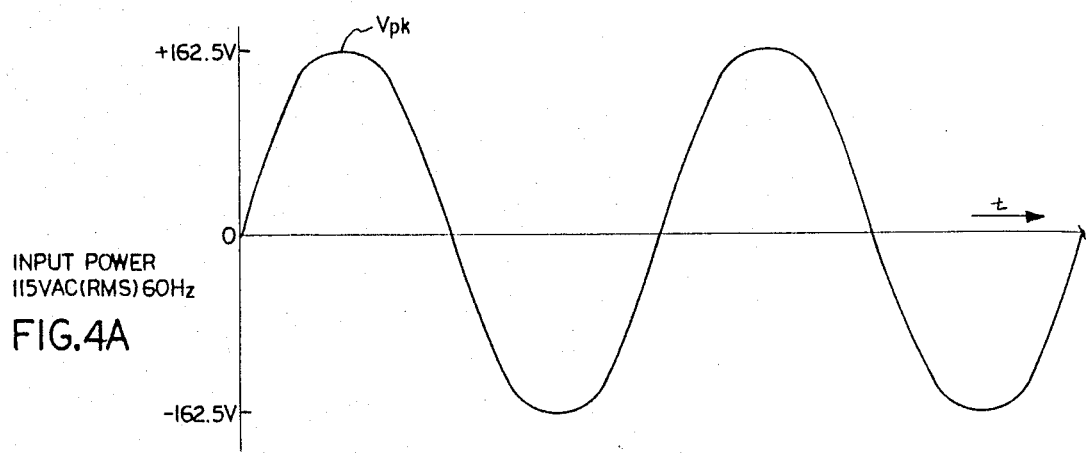
INPUT POWER
115VAC(RMS) 60Hz
FIG.4A
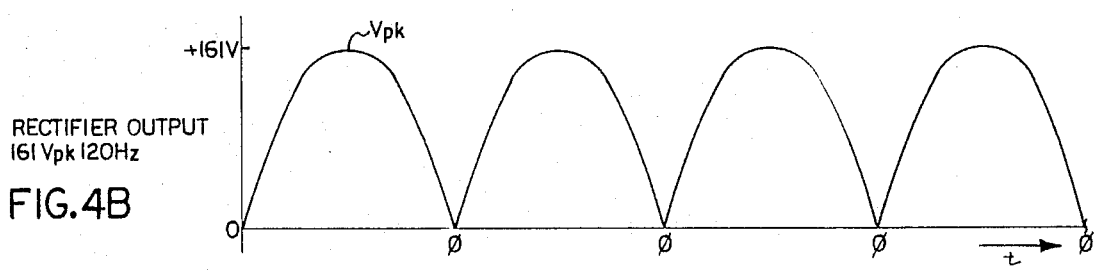
RECTIFIER OUTPUT
161 Vpk 120Hz
FIG.4B
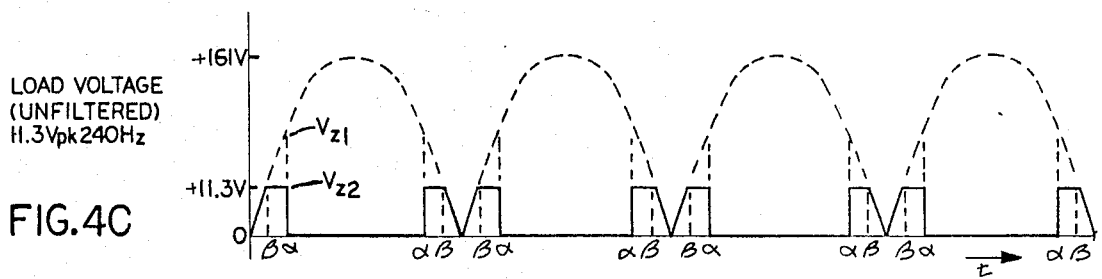
LOAD VOLTAGE
(UNFILTERED)
11.3Vpk 240Hz
FIG.4C
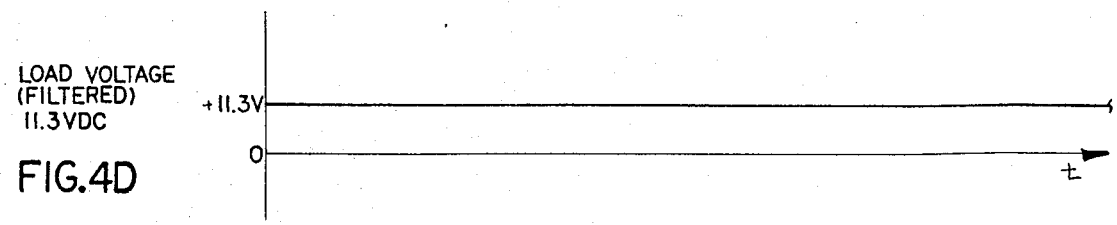
LOAD VOLTAGE
(FILTERED)
11.3VDC
FIG.4D
FIG.4

LOW VOLTAGE DIRECT CURRENT POWER SUPPLY

BACKGROUND OF THE INVENTION

The present invention relates in general to power supplies for electrical loads, and more particularly to a transformerless power supply of the electronic switching type that can be driven directly by alternating current from a commercial power line to energize a low voltage requirement direct current load.

Electronic, semiconductor-based circuits of, for example, the MOS-type or CMOS-type require only small amounts of low voltage direct current power to operate. To energize such circuits with power derived from commercial power lines of the alternating current type, requires the use of a direct current power supply interposed between the power lines and the electronic circuits. The direct current power supply converts the relatively high voltage alternating current from the commercial lines to a low voltage direct current that can be used by the associated electronic circuits. To date, such line driven power supplies have been primarily constituted by four well known types.

In the first type, a transformer is used to step down the line voltage and then rectify it to provide the required low voltage direct current. This first type of supply is disadvantageous due to the weight and bulk of its inductive element, i.e. the transformer.

In a second type of prior art supply, commonly referred to as a switching supply, a line driven rectifier charges a capacitor to the peak voltage of the alternating current line. A semiconductor switch operating at a predetermined duty cycle applies the capacitor voltage in a pulselike fashion to an output coil which in turn provides the required low voltage direct current to a load. Like the transformer-based first type of supply discussed above, this second type of supply suffers the same disadvantage of having a relatively heavy and bulky inductive element, i.e. the output coil.

The third and fourth types of known line driven direct current supplies are, respectively, resistive dividers and capacitive reactance dividers, both of which function in a well known manner to divide the alternating current line voltage into larger and smaller portions, the smaller portion of which is rectified to supply low voltage direct current to a load. Both of these divider type supplies are disadvantageous due to inefficiency and/or poor voltage regulation.

It should also be noted that thyristor devices can be directly driven by line voltage to provide variable direct current power to a load. However, the use of thyristors in a low voltage direct current supply is undesirable due to the lack of triggering stability at low switching voltages and due to other inherent disadvantages.

It is a purpose of the present invention to provide an inductorless, line driven, low voltage, direct current power supply for energizing a low power requirement direct current load. Such a power supply should be highly reliable, highly efficient, and low in cost.

SUMMARY OF THE INVENTION

In accordance with the present invention, a means for providing direct current pulses at a fixed frequency is preferably comprised of a rectifier bridge having its input directly connectable to an alternating current line, the output of the bridge providing the fixed frequency direct current pulses. Each pulse has a gradually increasing leading edge and a gradually decreasing trailing edge, the peak voltage of each pulse exceeding the voltage requirements of a low power, direct current load to be energized.

An electronic switching means or variable impedance means, in the preferred form of a bipolar transistor or a field-effect transistor, is connectable to the means for providing direct current pulses and to the load to be energized. The switching means or variable impedance continuously applies to the load only a leading edge portion and a trailing edge portion of each direct current pulse. The peak voltage of the applied portions is less than the peak voltage of the direct current pulses so as to meet the relatively low voltage requirements of the direct current load.

In one embodiment, a bipolar transistor functioning as an electronic switching means is triggered on and off by another bipolar transistor driving the base of the switching bipolar transistor in response to the sensing of the increasing and decreasing voltage at the bridge output.

In another embodiment, a field-effect transistor functioning as an electronic variable impedance means that is triggered on and off by a comparator configured operational amplifier, which senses the increasing and decreasing voltage at the bridge output, a current regulator configured operational amplifier controlling the variable impedance field-effect transistor in accordance with the state of the operational amplifier sensing the voltage at the bridge output.

BRIEF DESCRIPTION OF THE DRAWINGS

A fuller understanding of the invention may be had by referring to the following description and claims taken in conjunction with the accompanying drawings, wherein:

FIGS. 4a, 4b, 4c, and 4d are waveform diagrams illustrating the operation of the circuit of FIG. 3.

DETAILED DESCRIPTION OF THE PREFERRED EMBODIMENTS

Figure 1:
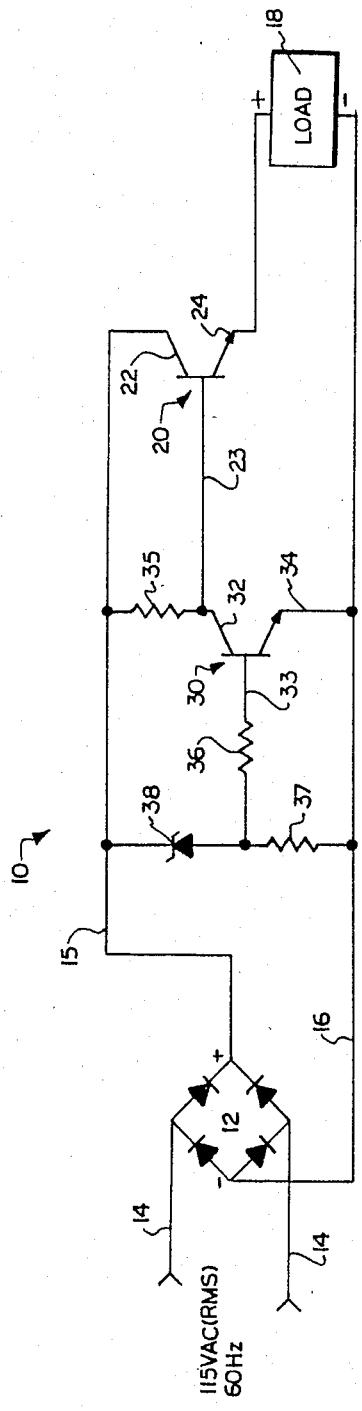
FIG. 1 is a schematic diagram of a circuit constituting a first embodiment of a low voltage, direct current power supply in accordance with the present invention.

With reference to FIG. 1, a first embodiment of a low voltage, direct current power supply 10 in accordance with the present invention as illustrated. The supply 10 includes means for providing direct current voltage pulses at a fixed frequency in the preferred form of a full-wave bridge rectifier 12, of for example four type 1N4007 diodes, having its input connected by a pair of power input lines 14 to a commercial power source which for example provides 115 volt RMS alternating current of the sinusoidal type at a frequency of 60 Hz. As is well known in the art, the output of the bridge will provide pulsating direct current voltage at a frequency of 120 Hz to a positive direct current voltage line 15 referenced to a negative direct current voltage line 16.

A direct current load 18 is connected in electrical series relationship between the direct current voltage lines 15, 16 via an electronic switching means in the form of a first bipolar transistor 20 of for example a type 2N3440 NPN transistor. It can be seen that the electronic switching means in the form of the first bipolar transistor 20 is connectable to the pulse providing means constituted by the bridge 12 and to the direct current load 18, wherein the pulsating direct current output voltage provided by the output of bridge 12 will be applied across the load 18, a current will flow therethrough, only when transistor 20 is in a conducting condition.

As illustrated in FIG. 1, the transistor 20 includes a collector electrode 22, a base electrode 23 and an emitter electrode 24. The collector electrode 22 is connected to the positive direct current voltage line 15, while the emitter electrode 24 thereof is connected to the positive terminal of the load 18, having its negative terminal connected to the negative voltage line 16. As is well recognized in the art, a suitable triggering or switching signal provided to the base electrode 23 of transistor 20 will determine the conducting state of such transistor. In the present invention, the transistor 20 is operated in a switching mode, that is, the transistor is driven either into a fully conducting condition or a fully nonconducting condition by control of its base electrode 23. Therefore, the full output voltage of the bridge rectifier 12 will be applied across the load 18 when transistor 20 is on but for a small collector-emitter voltage ($V_{BE}$) drop measured across transistor 20 which is negligible. Conversely, when transistor 20 is in a fully off or non-conducting condition, the bridge output voltage is across the transistor 20 and not the load 18.

To control the switching of the first bipolar transistor 20, a second bipolar transistor 30, of for example a type 2N3440 NPN transistor, is provided such a second transistor 30 having a collector electrode 32, a base electrode 33 and emitter electrode 34. The collector electrode 32 is connected to one end of a load resistor 35, of for example 47 kilohms, having its other end connected to the positive direct voltage current line 15. The collector electrode 32 is also directly connected to the base electrode 23 of the first bipolar transistor 20 as illustrated. The emitter electrode 34 of the second transistor 30 is directly connected to the negative direct current voltage line 16.

The base electrode 33 of the second transistor 30 is connected to one end of a base current resistor 36, of for example 100 kilohms, having its other end connected to a bridge output voltage sensing network constituted by a series connected current limiting resistor 37, of for example 39 kilohms, and a 12 volt zener diode 38, of for example a type 1N5266. The zener diode 38 has its cathode connected to the positive direct current voltage line 15 while its anode is connected to one end of the current limiting resistor 37 having its other end connected to the negative direct current voltage line 16 as illustrated. That end of the base current resistor 36 not connected to the base electrode 33, is connected to the junction between the anode of the zener diode 38 and resistor 37 as illustrated.

Figure 2:
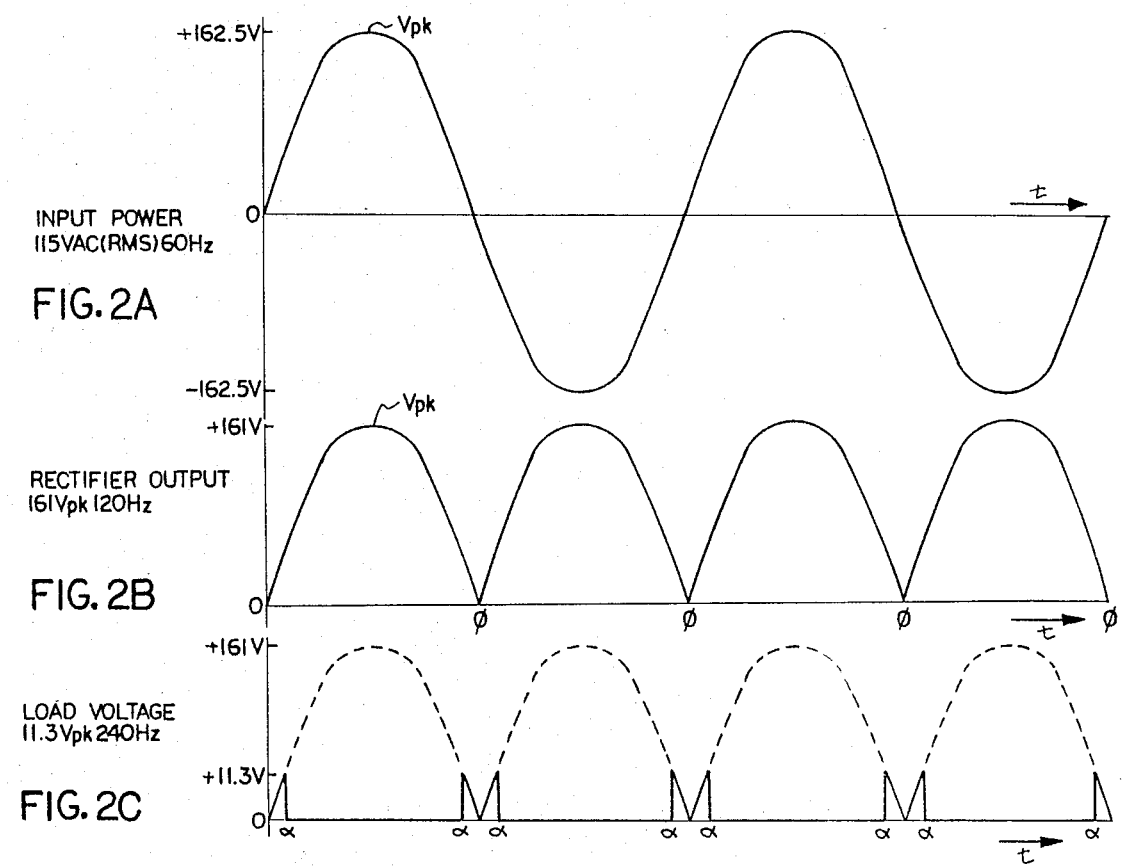
FIGS. 2a, 2b, and 2c are waveform diagrams illustrating the operation of the circuit of FIG. 1.

With reference to both FIG. 1 and FIG. 2, the operation of the circuit of FIG. 1 will now be set forth. It is to be noted that the waveform diagrams of FIG. 2, and also of FIG. 4 to be subsequently discussed, are not drawn to proportional scale, but rather are presented in a fashion that will accentuate the operation of applicant's invention as will become apparent. As illustrated by waveform diagram FIG. 2A of FIG. 2, the input to the full wave bridge 12 is constituted by commercial alternating current power in the form of 60 Hz alternating current voltage swinging in sinusoidal fashion between a positive peak voltage of +162.5 volts and a negative peak voltage of −162.5 volts as illustrated. With such conventional commercial power provided to the input of bridge 12, its output, as illustrated by FIG. 2B of FIG. 2, is constituted by 120 Hz direct current pulses each having a peak voltage of +161 volts due to the voltage drop across the bridge diodes. The zero voltage points of the pulses illustrated in the middle waveform diagram of FIG. 2 are indicated at points $\phi$. As is well known in the art, the rectified sinusoidal input power provides direct current voltage pulses at a fixed frequency, each of the direct current voltage pulses having a gradually increasing leading edge and a gradually decreasing trailing edge relative to a zero voltage level. This increasing and decreasing voltage of each of the direct current voltage pulses at the rectifier output is applied across the voltage sensing network provided by resistor 37 and zener diode 38. It will be also recognized that at the beginning of each direct current pulse transistor 20 will be driven into a fully conducting condition via base current supplied to its base electrode 23 via resistor 35 since transistor 30 is in a nonconducting condition due to the fact that zener diode 38, having for example a 12 volt firing voltage, is in a nonconducting condition. Thus, transistor 20 is in a fully conducting or saturated condition wherein the direct current voltage across lines 15 and 16 is applied across load 18 to power it. At approximately a +12 volt point on the leading edge of the direct current voltage pulses (see FIG. 2C of FIG. 2), zener diode 38 will fire at time $\alpha$ so as to supply base current via resistor 36 to the base electrode 33 of transistor 30 so as to turn it on into a fully conducting condition wherein the base electrode 23 of transistor 20 is directly connected to the negative voltage line 16 via saturated transistor 30. Transistor 20 will then switch off to a fully nonconducting condition wherein the direct output voltage of bridge 12 will no longer be applied to load 18. As the output voltage of bridge 20 increases to its +161 volt peak, transistor 30 will remain in a saturated condition while transistor 20 remains in a nonconducting condition. Once the DC voltage has passed its +161 volt peak it will gradually decrease to a +12 volt DC level wherein the zener diode 38 will switch off to a non-conducting condition to in turn switch off transistor 30 so as to again turn on transistor 20 thus once again apply the direct current output voltage of the bridge across the load 18. This process of alternate switching on and off in complementary fashion by transistors 20 and 30 will continue for each of the direct current pulses provided at the output of bridge 12.

With further reference to FIG. 2C of FIG. 2, it can be seen that due to the switching action of the transistors 20, 30 (FIG. 1) only a small 11.3 volt peak (12 volts $-V_{BE}$) leading edge portion and a corresponding 11.3 volt peak trailing edge portion of each direct current pulse provided at the rectifier output is applied to the load to power it at its required low voltage level. It has been found that the circuit of FIG. 1 with the noted components can provide approximately 12 volts direct current power to the load 18 at a 50 milliamp level. In effect, these leading edge and trailing edge portions as indicated in FIG. 2C constitute low voltage direct current pulses at a 240 Hz rate which are applied across the load. It can be seen that the selected firing point or voltage of the zener diode 38 determines the peak voltage of the applied voltage portions across the load 18.

In accordance with the present invention, the peak voltage of the pulses provided at the rectifier output, which substantially exceed the voltage requirements of the load, are in effect reduced to a lower voltage level by applying to the load only a small leading edge portion and trailing edge portion of each direct current pulse. While sinusoidal type direct current pulses have been illustrated, it is to be understood that other direct current pulse forms, e.g. triangular, could be used in practicing the present invention which simply requires that the subject direct current pulse have at least a gradually increasing leading and a gradually decreasing trailing edge.

As will be recognized by those in the art, the RMS value of the voltage ($V_{RMS}$) applied across the load 18 of FIG. 1, can be generally represented (with reference to FIG. 2) by the following mathematical formula:

$$V_{oRMS} \cong \sqrt{\frac{V_{pk}^2}{\pi/2} \int_{\phi}^{\alpha} \sin^2 \theta \, d\theta}$$

where
$V_{pk}$ = peak voltage of direct current voltage pulses (FIG. 2B)
$V_z$ = peak voltage of applied voltage portion (FIG. 2C)
$\alpha = \arcsin V_z/V_{pk}$; $\alpha \leq \pi/2$ With reference to FIG. 3, a modification of the embodiment of FIG. 1 is illustrated wherein load voltage regulation is provided. The common elements of the circuit of FIG. 3 as compared to FIG. 1 carry common identification numbers. Additional elements to the circuit of FIG. 3 include an optional zener diode 40, for example of a type 1N5257, having its cathode connected to base electrode 23 of transistor 20 with its anode connected to the negative voltage line 16 as illustrated. The diode 40 with the transistor 20 function as a load voltage regulator as will become apparent. The circuit of FIG. 3 also includes an optional filter network constituted by a blocking diode 42 and a filter capacitor 44. The filter capacitor 44 is connected in proper polarity across the load 18 in parallel relation as illustrated, the diode 42 having its cathode connected to the positive terminal of the load 18 and filter capacitor 44, with its anode being connected to the emitter electrode 24 of transistor 20.

Figure 3:
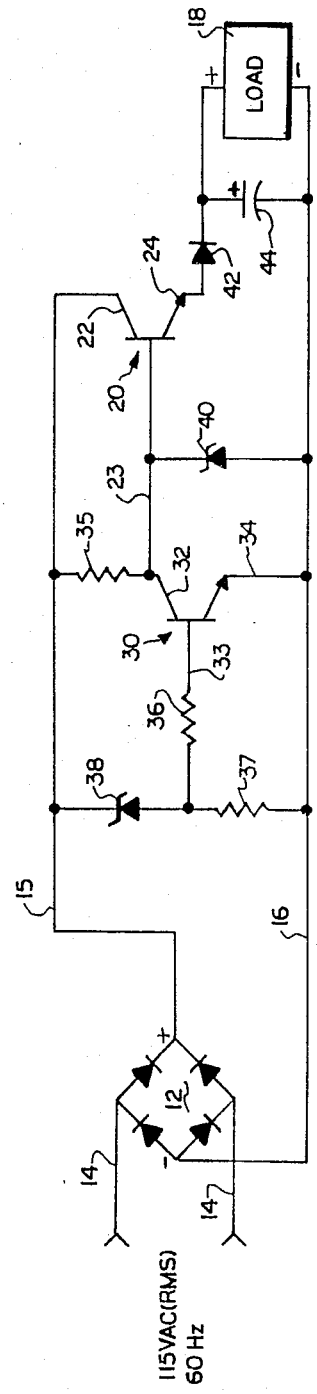
FIG. 3 is a schematic diagram of another circuit constituting a modification of the circuit of FIG. 1 demonstrating voltage regulation.

With reference to FIG. 4, the operation of the circuit of FIG. 3 will be set forth. As illustrated in FIG. 4A of FIG. 4, input power in the form of sinusoidal alternating current voltage of 115 volts RMS at 60 Hz is provided to the input of the bridge 12 via commercial power lines 14 wherein, with reference to FIG. 4B of FIG. 4, the rectifier output provides +161 volt direct current voltage pulses of 120 Hz.

With reference to the unfiltered load voltage illustrated by FIG. 4C of FIG. 4, it can be seen that the effect of zener diode 40 (FIG. 3) is to clamp the peak voltage of the applied pulse portions at 12 volts at point $\beta$, for example until transistor 20 switches off at point $\alpha$, a higher firing voltage, e.g. 16 volts, being chosen for zener diode 38. Such a feature allows the circuit of FIG. 3 to provide 12 volt direct current power to the load 18 at a higher current level of for example 250 milliamps as opposed to the 50 milliamp capability of the earlier discussed circuit of FIG. 1.

The RMS output or load voltage ($V_{oRMS}$) of the circuit of FIG. 2 is generally represented (with reference to FIG. 4) by the following mathematical formula:

$$V_{oRMS} \cong \sqrt{\frac{V_{pk}^2}{\pi/2} \int_{\phi}^{\beta} \sin^2 \theta \, d\theta + \int_{\beta}^{\alpha} V_{z2} \, d\theta}$$

where
$V_{pk}$ = peak voltage of direct current voltage pulses (FIG. 4B)
$\alpha = \arcsin V_{z1}/V_{pk}$; $\alpha \leq \pi/2$
$\beta = \arcsin V_{z2}/V_{pk}$; $\beta \leq \alpha$
$V_{z1}$ = firing voltage of zener diode 38
$V_{z2}$ = firing voltage of zener diode 40

With reference to FIG. 4D of FIG. 4, it can be seen that blocking diode 42 and filter capacitor 44 act in a conventional manner to provide a relatively constant nonpulsating +12 volts across the load 18.

Figure 5:
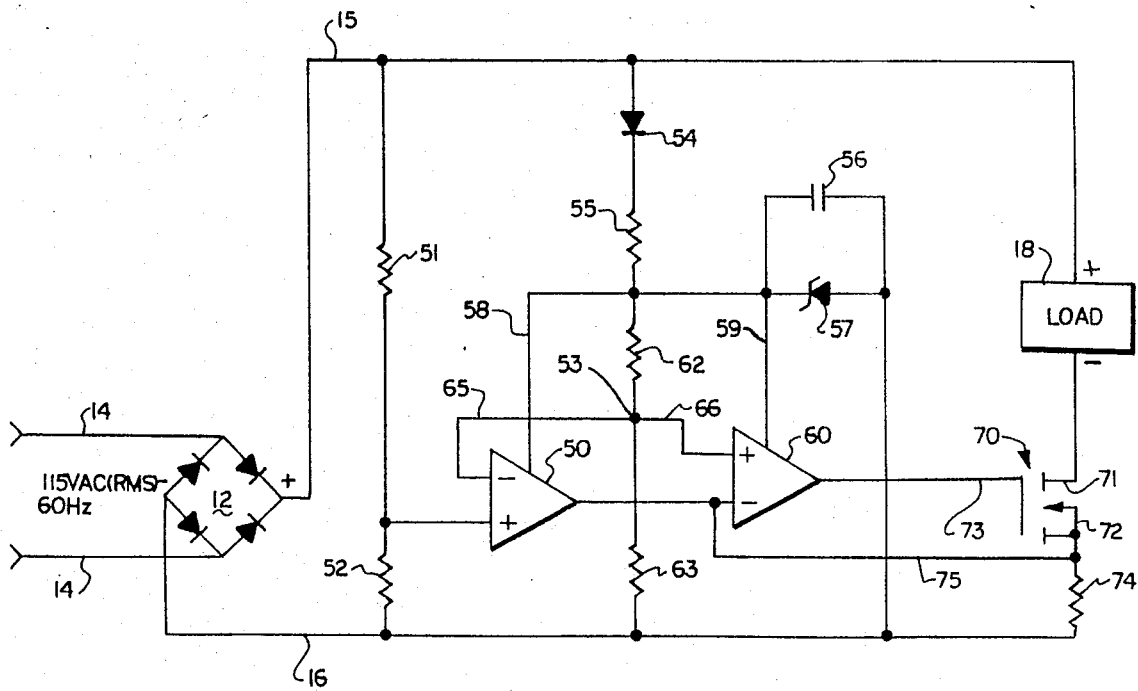
FIG. 5 is a schematic diagram of a circuit constituting a second embodiment of a low voltage, direct current power supply in accordance with the present invention demonstrating current regulation.

With reference to FIG. 5, a second embodiment of a low voltage direct current power supply in accordance with the present invention is illustrated wherein load current regulation is provided. As in the case of FIGS. 1 and 3, common elements of the circuit of FIG. 5, as compared to the circuits of 1 and 3, are identically numbered.

The commercial power lines 14 provide to the input of the bridge 12, 115 volt RMS alternating current of 60 Hz, wherein the output of the bridge 12 provides 120 Hz direct current pulses of 161 volt peaks to the positive direct current voltage line 15 and the negative direct current voltage line 16. The load 18 is connected in series between the lines 15, 16 via another electronic switching means in the illustrated form of a field-effect transistor 70 having a drain electrode 71, a source electrode 72 and a gate electrode 73. It can be seen that the source and drain electrodes 71 and 72 are connected in series with the load 18. More specifically, the drain electrode 71 is connected to the negative terminal of the load 18 while the source electrode 72 is connected to the negative voltage line 16 via a current set resistor 74. Switching on and off of the field-effect transistor 70 so as to apply only small leading edge and trailing edge portions of the direct current pulses aross lines 15 and 16 as taught above is provided by a first comparator configured operational amplifier 50 and a second current regulator configured operational amplifier 60. A conventional power supply network portion, comprised of a filter capacitor 56 connected in parallel across a zener diode 57 is provided, the anode of the zener diode 57 being connected to the negative voltage line 16. The cathode of zener diode 57 is connected to one end of a power supply resistor 55 having its other end connected to the cathode of a power supply diode 54 having its anode connected to the positive direct current voltage line 15 as illustrated. The diode 54, the resistor 55, the capacitor 56 and zener diode 57 function together to act as a conventional power supply to amplifiers 50, 60 via power supply lines 58, 59 and to also function as a reference voltage source applied to one end of a voltage dividing resistor 62 having its other end connected to the inverting input of amplifier 50 via a first reference voltage line 65, and to the noninverting input of amplifier 60 via a second reference voltage line 66 as illustrated. A reference voltage junction 53 constituted by the interconnection of resistor 62 and lines 65, 66 is connected to one end of a fourth voltage dividing resistor 63 having its other end connected to the negative voltage line 16 as illustrated.

As will be appreciated in the art, the relatively stable voltage provided by elements 54, 55, 56 and 57 is divided by series connected resistors 62, 63 to provide a stable reference voltage at junction 53 which is applied to the reference inputs of the operational amplifiers 50, 60 as illustrated. Such a voltage for example could be +12 volt direct current voltage which would be the desired voltage developed across resistor 74.

The output of the voltage from bridge 12 is monitored by a voltage sensing network comprising a first voltage dividing resistor 51 connected in series with a second voltage dividing resistor 52, the series connected resistors 51, 52 being connected between lines 15 and 16 as illustrated. The junction between resistors 51, 52 provides a reduced portion of the output voltage of the bridge 12 to the noninverting input of operational amplifier 50. The output of amplifier 50 is in turn applied to the inverting input of amplifier 60 which is also connected to the junction of the source electrode 72 and current set resistor 74 by a load current feedback line 75 as illustrated. The output of amplifier 60 is in turn connected directly to the gate electrode 73 of the field-effect transistor 70.

At the beginning of each direct current voltage pulse provided by the output of the bridge 12, the state of the output of amplifier 60 is such that transistor 70 is switched into a variable impedance conducting condition so that the voltage across lines 15, 16 is provided across load 18. When the voltage sensed by the network constituted by resistors 51 and 52 reaches a predetermined level, for example +12 volts, amplifier 50 will switch states at its output to in turn cause the turn off of amplifier 60 so as to turn off transistor 70 until the direct current voltage across lines 15 and 16 gradually decreases to a +12 volt level wherein amplifier 50 will again change states to in turn change the state of amplifier 60 and once again turn on transistor 70. It can be appreciated that the amplifiers 50 and 60 switch on and off in complementary fashion wherein only a small leading edge portion and correspondingly a small trailing edge portion of each direct current pulse provided by bridge rectifier 12 is applied to the load 18. It can also be appreciated that amplifier 60, transistor 70, and current set resistor 74 with feedback line 75 function in a conventional manner to regulate load current by varying the impedance of transistor 70.

Thus, it can be seen with regard to the proceeding discussion of FIGS. 1 through 5 that in accordance with the present invention only small low voltage leading and trailing edge portions of direct current pulses are applied to a load so as to provide the required low voltage low current power to such load. It is to be recognized that numerous switching devices such as PNP bipolar transistors, enhancement or depletion FET's, operational amplifiers and the like can be used to practice the present invention. The present invention, and the illustrated circuit embodiments thereof, have been found to provide a line driven, transformerless, low voltage, direct current power supply that is highly reliable and low in cost due primarily to the small number of components.

Although the preferred embodiment of this invention has been shown and described, it should be understood that various modifications and rearrangements of the parts may be resorted to without departing from the scope of the invention as disclosed and claimed herein.

What is claimed is:

1. A transformerless, low voltage, direct current, regulated power supply of the switching type, for energizing a low power requirement direct current load comprising:

means for providing direct current voltage pulses at a fixed frequency, each pulse having a gradually increasing leading edge and a gradually decreasing trailing edge, the peak voltage of said pulses exceeding the voltage requirements of said load; and electronic means electrically connectable to said pulse providing means and said load, said electronic means continuously applying to the load only a leading edge portion and a trailing edge portion of each of said pulses, the peak voltage of said applied portions being less than the said peak voltage of said pulses so as not to exceed the voltage requirements of said direct current load, said electronic means including regulating means (40, 60) for clamping the peak level of said edge portions at a predetermined upper level to increase the amount of power provided to said load by said edge portions without said peak level of said edge portions exceeding said predetermined upper level, and switching means (38, 50) for causing said electronic means to only apply to said load said leading and trailing edge portions of said pulses.

2. A power supply according to claim 1, wherein said direct current pulse providing means includes a bridge rectifier having an input connectable to an alternating current voltage source and an output for providing said direct current pulses to said electronic means, said direct current pulses resulting from rectification by said bridge of alternating current voltage provided by said source.

3. A power supply according to claim 2, wherein said input is directly connectably to a commercial alternating current power line for providing alternating current to said full wave bridge rectifier.

4. A transformerless, low voltage, direct current, regulated power supply of the switching type, for energizing a low power requirement direct current load comprising:

a full wave bridge rectifier (12) having an input connectable directly to a commercial alternating current power line and an output providing, in response to alternating current voltage provided at said input by said power line, direct current voltage pulses at a fixed frequency, each pulse having a gradually increasing leading edge and a gradually decreasing trailing edge, the peak voltage of said pulses exceeding the voltage requirements of said load; and at least a first transistor (20, 70) connectable in electrical series relationship with said load, said first transistor switching on and off to continuously apply to the load only a leading edge portion and a trailing edge portion of each of said pulses, the peak voltage of said applied portions being substantially less than the said peak voltage of said pulses so as not to exceed the voltage requirements of said direct current load, said power supply including regulating means (40, 60) for clamping the peak level of said edge portions at a predetermined upper level to increase the amount of power provided to the said load by said edge portions without said peak level of said edge portions exceeding said predetermined upper level, and switching means (38, 50) for causing said transistor to switch on and off so as to only apply to said load said leading and trailing edge portions of said pulses.

5. A power supply according to claim 4, wherein said first transistor is a bipolar transistor having a collector electrode, an emitter electrode, and a base electrode, the collector and emitter electrodes being connectable in electrical series relationship with said load, the base electrode being provided with a triggering signal to effect said on/off switching of said first transistor.

6. A power supply according to claim 5, including a second bipolar transistor having a collector electrode, an emitter electrode, and a base electrode, said power supply further including a voltage sensing network for sensing the output voltage of said bridge rectifier, one of said collector or emitter electrode of said second transistor being electrically connected to the base electrode of said first transistor to provide said triggering signal thereto, said base electrode of said second transistor being connected to the output of said bridge via said voltage sensing network wherein at a predetermined sensed increasing voltage at said bridge output, with said first transistor is in a fully conducting condition, and said second transistor in a fully nonconducting condition, said second transistor switches to a conducting condition and said first transistor switches to a fully nonconducting condition, and wherein at a predetermined sensed decreasing voltge at said bridge output, with said first transistor in a fully nonconducting condition and said second transistor in a fully conducting condition, said second transistor switches to a fully nonconducting condition and said first transistor switches to a fully conducting condition, wherein only said leading edge and trailing edge portions of said direct current voltage pulses are continuously applied to said load via said first transistor.

7. A power supply according to claim 4, wherein said first transistor is a field-effect transistor having a source electrode, a drain electrode, and a gate electrode, the source and drain electrodes being connectable electrical series relationship with said load, the gate electrode being provided with a triggering signal to effect said on/off switching of said field-effect transistor.

8. A power supply according to claim 7, including a voltage sensing network for sensing the output voltage of said bridge rectifier, said power supply further including a pair of operational amplifiers, one of said operational amplifiers being comparator configured and having an input electrically connected to said voltage sensing network, said other operational amplifier being configured as a current regulator the output of said one operational amplifier being connected to an input of the other operational amplifier, the output of said other operational amplifier being connected to the gate of said field-effect transistor to provide variable feedback to said field-effect transistor, wherein in response to a predetermined sensed rising voltage at said bridge output, with the field-effect transitor in a variable impedance conducting condition, the state of the output of said comparator configured operational amplifier switches to the opposite state wherein said field-effect transistor switches to a fully nonconducting condition, and wherein at a predetermined sensed decreasing voltage at said bridge output, with the field-effect transistor in a fully nonconducting condition, the states of the outputs of said comparator configured operational amplifier again switches to the opposite state wherein said field-effect transistor switches to said variable impedance conducting condition, wherein only said leading edge and trailing edge portions of said direct current voltage pulses are continuously applied to said load via said field-effect transistor.

* * * * *